Feb. 9, 1926.
E. A. BANSCHBACH
1,572,460
AUTOMOBILE FENDER AND GUARD
Original Filed May 17, 1920   2 Sheets-Sheet 1
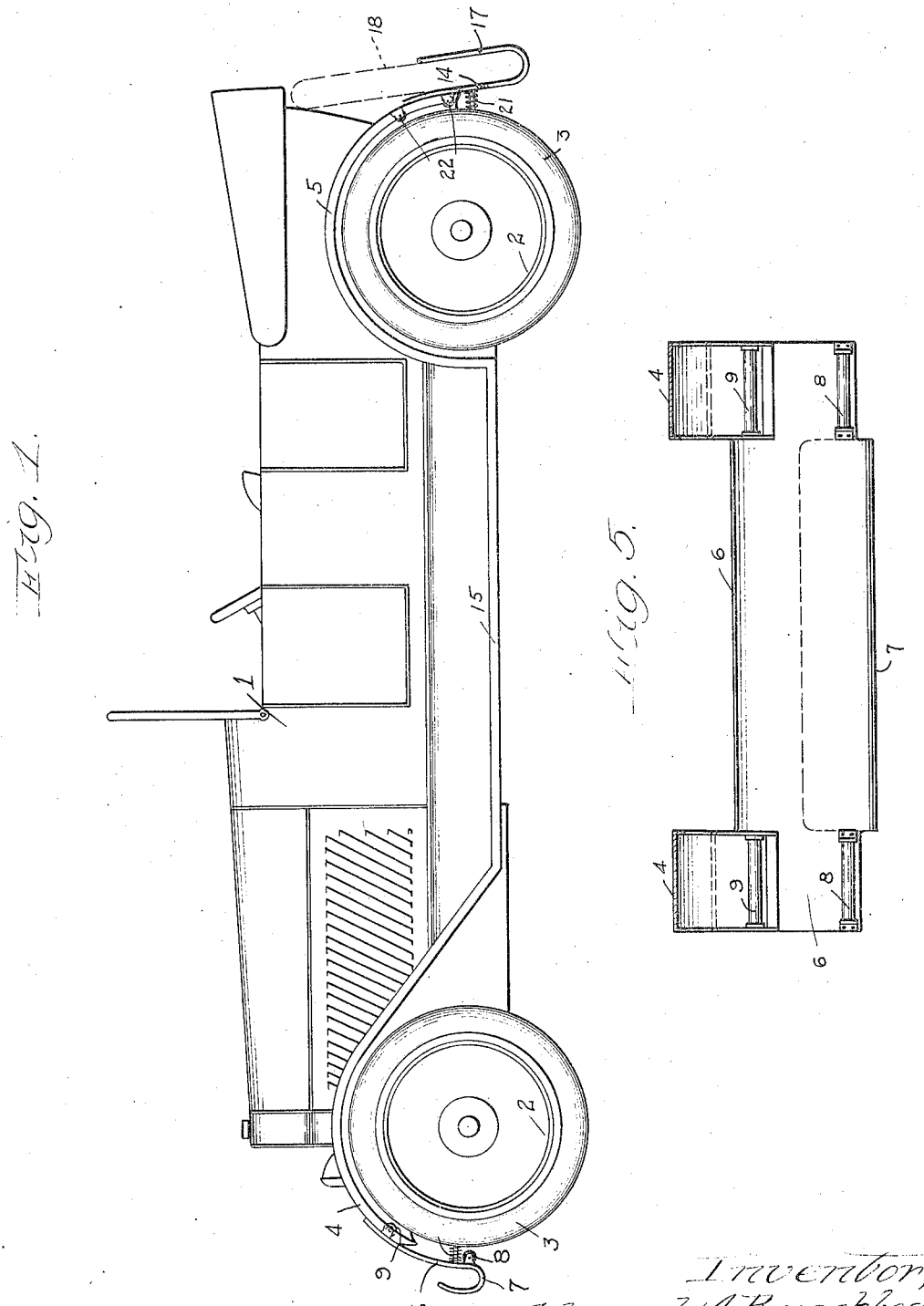

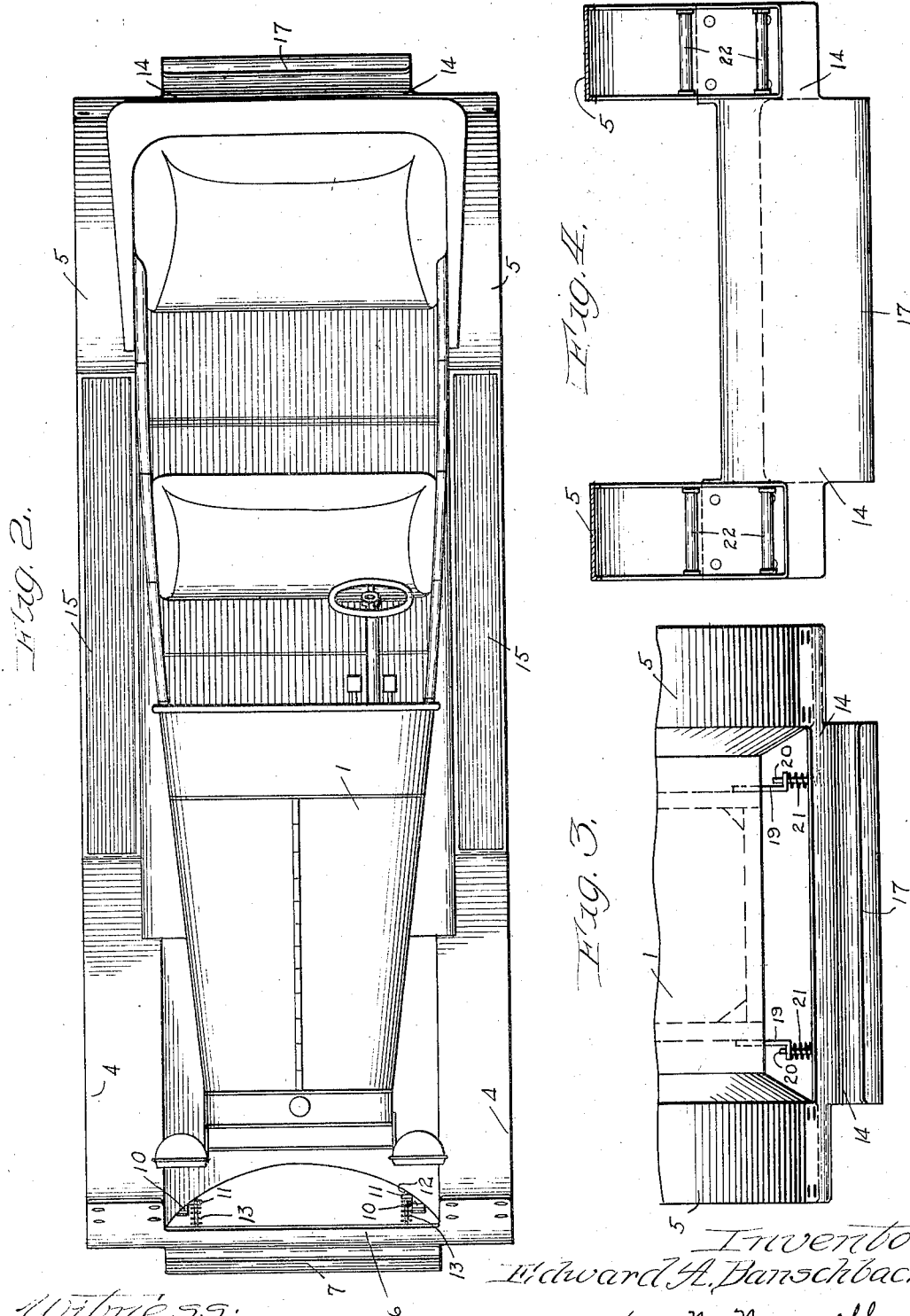

Patented Feb. 9, 1926.

1,572,460

UNITED STATES PATENT OFFICE.

EDWARD A. BANSCHBACH, OF CHICAGO, ILLINOIS.

AUTOMOBILE FENDER AND GUARD.

Application filed May 17, 1920, Serial No. 381,860. Renewed July 1, 1922. Serial No. 572,305.

*To all whom it may concern:*

Be it known that I, EDWARD A. BANSCH-BACH, a citizen of the United States, residing at Chicago, in the county of Cook and State of Illinois, have invented certain new and useful Improvements in Automobile Fenders and Guards, of which the following is a specification.

This invention relates to means for protecting a vehicle such as an automobile, not only at the front and rear thereof, but for providing a guard practically surrounding the entire vehicle, so that any damage due to collision or accident will be warded off from the body of the machine, or at least it will be protected from accident in all directions. The principal object of the invention is therefore to provide a guard for a vehicle of this kind which shall be a composite part of the vehicle itself. Other objects of the invention will appear hereinafter. The invention consists in the construction, combination and arrangement of the several parts.

In the accompanying drawings, Fig. 1 is a side elevation of an automobile constructed in accordance with the principles of this invention; Fig. 2 is a plan view; Fig. 3 is a plan view illustrating the rear bumper; Fig. 4 is a sectional view of the rear fenders and bumper from the underside of the fenders; and Fig. 5 is a sectional view of the front bumper from the underside thereof.

It is customary to equip an automobile with bumpers at the front and rear which are attached to the frame of the vehicle, and these bumpers usually are resilient or have some spring action which will lessen the impact which is imparted to the machine when something is engaged by the bumper.

The present invention contemplates the attachment of a front and rear bumper to the front and rear extremities of the fenders, in making the fenders of somewhat stronger and more resilient material, and in providing resilient means and rollers for cushioning any impact which is imparted to these bumpers. The rear bumper may also be so formed as to provide a receptacle for a spare tire.

Referring now more particularly to the drawings, an automobile designated generally by the reference numeral 1, and having wheels 2, with tires 3, is also provided with front and rear fenders 4 and 5 which are preferably made of sheet metal stamped or formed in the desired shape with their extremities extending somewhat beyond the body of the machine, and having a certain amount of resilience due to the material of which they are made.

Attached to the extremities of the front fenders 4 is a bumper 6 also preferably formed of sheet metal, and having a central extension 7 rounded upwardly in advance of the fenders themselves and constituting the front bumper. At the underside of this bumper and opposite the tires 3 of the wheels, are rollers 8, and at the underside of the forward end of the front fenders proper are additional rollers 9 which are adapted to engage the tires of the wheels when the bumper is bent inwardly.

Attached to an extension 10 of the forward end of the vehicle frame is a perforated bracket 11, through which a rod 12 extends that is attached to the underside of the front bumper 6. Surrounding the rod between the bumper and the bracket is a spring 13 which forms an additional cushion for the front bumper.

At the rear of the automobile is a bumper 14 which extends across and is attached to the rear ends of the rear fenders 5, with an intermediate upturned portion 17 which forms the bumper proper and also constitutes a carrier for a spare tire 18. This bumper is likewise cushioned from the frame of the vehicle by means of brackets 19, through which the rods 20 extend, the rods being surrounded between the brackets and the fender by cushioning springs 21. On the underside of the rear end of these fenders 5, are contact rollers 22 which are adapted to engage with the tires of the rear wheels only when the cushioning springs 21 have been compressed.

With this construction it is obvious that the automobile is protected not only at the front and rear, but also that the fenders themselves form an additional protection so that the automobile is protected on all sides from engagement and is thus safeguarded from accident. In fact, the front and rear fenders 4 and 5 may be formed as a continuation of the running board 15 on each side, so that the body of the machine has a continuous protecting guard completely surrounding it.

I claim:

1. An automobile protector comprising a pair of opposite fenders with projecting and resilient ends, a bumper connected to the ends, and resilient means extending between the frame of the automobile and the bumper.

2. In combination with the fenders of an automobile, of a bumper connected to the ends thereof and comprising a resilient member turned upwardly at its outer end, and additional means to press the bumper resiliently outward.

3. The combination with an automobile having wheels and fenders with resilient ends, of a bumper comprising a member connected to the ends of the fenders, and extending across the machine, and means in connection with the underside of the fenders for engaging the wheels when the fender ends are bent inwardly.

4. In an automobile guard, a fender having a projecting resilient extremity, a wheel disposed under the fender and adjacent the said extremity thereof, and rollers in connection with the fender adapted to engage the wheels when the extremity of the fender is bent inwardly.

5. The combination with an automobile having fenders with resilient extremities, and wheels below the fenders adjacent the underside of the extremity, of a bumper extending between opposite fenders and secured to the resilient extremities thereof, the bumper itself being formed with a projecting resilient portion, a spring interposed between the automobile frame and the bumper tending to press the latter outwardly, and rollers on the underside of the fender and bumper adapted to engage the wheels when the bumper and fenders are flexed inwardly against the springs.

6. The combination with a vehicle having side fenders at the front and back which extend beyond the body of the vehicle, and a bumper of resilient material connected to these projecting extremities at the front and rear of the vehicle so that it will be surrounded on all sides by a guard or protector.

7. A vehicle bumper of the class described comprising a pair of fenders, the extremities of which are resilient and project beyond the body of the vehicle, and a resilient member connected to these extremities and having an extending upturned projection.

EDWARD A. BANSCHBACH.